US009955328B2

United States Patent
Daly et al.

(10) Patent No.: US 9,955,328 B2
(45) Date of Patent: Apr. 24, 2018

(54) EMERGENCY ALERT SYSTEM CHANNEL ASSIGNMENT

(71) Applicant: AT&T Mobility II LLC, Atlanta, GA (US)

(72) Inventors: Brian Kevin Daly, Peachtree Corners, GA (US); DeWayne Allan Sennett, Redmond, WA (US); Alexander E. Silverman, Mercer Island, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/182,390

(22) Filed: Jun. 14, 2016

(65) Prior Publication Data

US 2016/0295389 A1 Oct. 6, 2016

Related U.S. Application Data

(63) Continuation of application No. 14/184,759, filed on Feb. 20, 2014, now Pat. No. 9,369,857, which is a continuation of application No. 13/449,524, filed on Apr. 18, 2012, now Pat. No. 8,693,980, which is a continuation of application No. 11/841,121, filed on Aug. 20, 2007, now Pat. No. 8,180,318.

(60) Provisional application No. 60/911,136, filed on Apr. 11, 2007.

(51) Int. Cl.
| | |
|---|---|
| *H04M 11/04* | (2006.01) |
| *H04W 4/22* | (2009.01) |
| *H04W 76/00* | (2018.01) |
| *H04B 10/2575* | (2013.01) |
| *H04W 4/02* | (2018.01) |
| *H04W 72/00* | (2009.01) |

(52) U.S. Cl.
CPC ........ *H04W 4/22* (2013.01); *H04B 10/25758* (2013.01); *H04W 4/02* (2013.01); *H04W 72/005* (2013.01); *H04W 76/007* (2013.01)

(58) Field of Classification Search
CPC ...... H04W 4/22; H04W 76/007; H04W 64/00
USPC ............. 455/404.2, 435.1, 456.1, 454, 404.1
See application file for complete search history.

(56) References Cited

U.S. PATENT DOCUMENTS

| | | | |
|---|---|---|---|
| 3,993,955 A | * 11/1976 | Belcher | ................ G08B 27/008 340/288 |
| 6,112,075 A | 8/2000 | Weiser | |
| 7,610,011 B2 | 10/2009 | Albrett | |
| 7,801,525 B2 | 9/2010 | Benco et al. | |

(Continued)

*Primary Examiner* — Nghi H Ly
(74) *Attorney, Agent, or Firm* — Baker & Hostetler LLP

(57) ABSTRACT

A device automatically is configured to the emergency alert system (EAS) channel utilized by the location from which the device registers with a network. In an example configuration, an EAS server provides a mobile switching center (MSC) configuration information regarding the emergency alert channels to be used for the cellular sites supported by the MSC. When the mobile device registers via a cellular site supported by the MSC, the designated channel to be used for EAS messages is sent to the mobile device as part of the registration process. The mobile device assigns an internal channel to the designated channel. In another example configuration, the mobile device is preconfigured with a table listing all possible EAS channels, and the MSC provides, during the registration process, a pointer to the appropriate portion of the table.

16 Claims, 5 Drawing Sheets

(56) References Cited

U.S. PATENT DOCUMENTS

| | | | |
|---|---|---|---|
| 8,180,318 B1* | 5/2012 | Daly | H04W 4/22 |
| | | | 370/328 |
| 8,693,980 B2* | 4/2014 | Daly | H04W 4/22 |
| | | | 370/328 |
| 9,369,857 B2* | 6/2016 | Daly | H04W 4/22 |
| 2003/0035075 A1* | 2/2003 | Butler | H04N 7/163 |
| | | | 348/734 |
| 2003/0043761 A1* | 3/2003 | Hladik | H04B 7/212 |
| | | | 370/319 |
| 2005/0188078 A1* | 8/2005 | Kotzin | H04N 7/163 |
| | | | 709/224 |
| 2006/0040639 A1 | 2/2006 | Karl et al. | |
| 2007/0142028 A1* | 6/2007 | Ayoub | H04M 3/5116 |
| | | | 455/404.1 |
| 2007/0186251 A1 | 8/2007 | Horowitz et al. | |
| 2007/0200949 A1* | 8/2007 | Walker | H04N 5/4401 |
| | | | 348/412.1 |
| 2009/0215425 A1 | 8/2009 | Ebersberger | |

* cited by examiner

EMERGENCY ALERT SYSTEM CHANNEL ASSIGNMENT

CROSS REFERENCE TO RELATED APPLICATIONS

The instant application is a continuation of, and claims priority to, U.S. patent application Ser. No. 14/184,759, filed Feb. 20, 2014. U.S. patent application Ser. No. 14/184,759 is a continuation of, and claims priority to, U.S. patent application Ser. No. 13/449,524, filed Apr. 18, 2012. U.S. patent application Ser. No. 13/449,524 is a continuation of, and claims priority to, U.S. patent application Ser. No. 11/841,121, filed Aug. 20, 2007, which issued on May 15, 2012 with U.S. Pat. No. 8,180,318. U.S. patent application Ser. No. 11/841,121 claims priority to U.S. provisional patent application No. 60/911,136, filed Apr. 11, 2007. U.S. patent application Ser. No. 14/184,759, U.S. patent application Ser. No. 13/449,524, U.S. Pat. No. 8,180,318, U.S. patent application Ser. No. 11/841,121, and U.S. provisional patent application No. 60/911,136 are incorporated by reference herein in their entirety.

TECHNICAL FIELD

The technical field generally relates to communications systems and more specifically relates to the broadcast of emergency messages. Even more specifically, the technical field relates to assigning a channel for emergency messages in accordance with the location of the device receiving the emergency message.

BACKGROUND

The wireless Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. To receive EAS messages, typically, a subscriber registers with a communications network via a mobile switching center (MSC). An MSC performs functions such as registration, authentication, location updating, handovers, and call routing. One MSC can support multiple cellular sites. Cellular sites can provide EAS messages on different channels. When a subscriber registers with an MSC, all emergency alert channels in the cellular sites supported by the MSC are reserved for EAS alert messages. Reserving multiple channels is an inefficient use of resources.

SUMMARY

A device is automatically configured to the emergency alert channel(s) of the current serving market. Accordingly, a channel for receiving emergency messages is automatically selected depending upon the location of the device. For example, Emergency Alert System (EAS) server provides a mobile switching center (MSC) configuration information regarding the emergency alert channels to be used for the cellular sites supported by the MSC. In an example embodiment, when the mobile device registers on a cellular site supported by the MSC, an indication of the channel to be used for EAS messages is sent to the mobile device as part of the registration process. When the mobile device notifies the MSC of a location update, the MSC sends an updated indication of EAS channel. In another example embodiment, the mobile device is pre-configured with a table of all possible emergency channel assignments. When the mobile device registers on a cellular site, the MSC provides, as part of the registration response, the pointers to the appropriate entries into the table or information that the mobile device can use to determine the appropriate channel. Whenever the mobile device notifies the MSC of a location update, the MSC sends an updated set of pointers to the appropriate table entries or information that the mobile device can used to determine the appropriate channel.

BRIEF DESCRIPTION OF THE DRAWINGS

The foregoing and other objects, aspects and advantages of EAS channel assignment will be better understood from the following detailed description with reference to the drawings.

DETAILED DESCRIPTION OF ILLUSTRATIVE EMBODIMENTS

The channel via which a mobile device receives an Emergency Alert System (EAS) message is assigned, within the mobile device, in accordance with the location (e.g., cellular site) of the mobile device. A cellular site comprises the geographic area in which a mobile device can communicate (receive and/or transmit) with a cellular transceiver. Channels other than the assigned channel need not be reserved for EAS messages, and thus are available for alternative use. A cellular site provides EAS messages via a designated channel. Different cellular sites can have different designated channels. In an attempt to efficiently utilize mobile device resources, the mobile device is configured to receive EAS messages via the designated channel in the cellular site in which the mobile device is located. It is to be understood that, if a cellular cite has multiple EAS designated channels, the mobile device is configured to assign the corresponding multiple channels for EAS messages. In one example embodiment, the mobile device is provided, during registration, information pertaining to the designated channel. In another example embodiment, the mobile device is preconfigured with a listing of all available designated channels and the mobile device is provided, during registration, a pointer to the appropriate designated channel.

Designated channels are described herein as applied to information pertaining to the EAS; however application is not limited thereto. The designated channel can comprise any channel dedicated for a specific purpose. For example, a designated channel can comprise any appropriate channel, such as a news channel, a foreign language channel, a weather channel, or the like. Thus, for example, a subscriber coming to the United States from Italy, would, in accordance with the herein described channel assignment process, upon the subscriber's mobile device registering with a network, automatically have his/her mobile device programmed to receive information on a designated channel that provides information in Italian.

Figure 1:
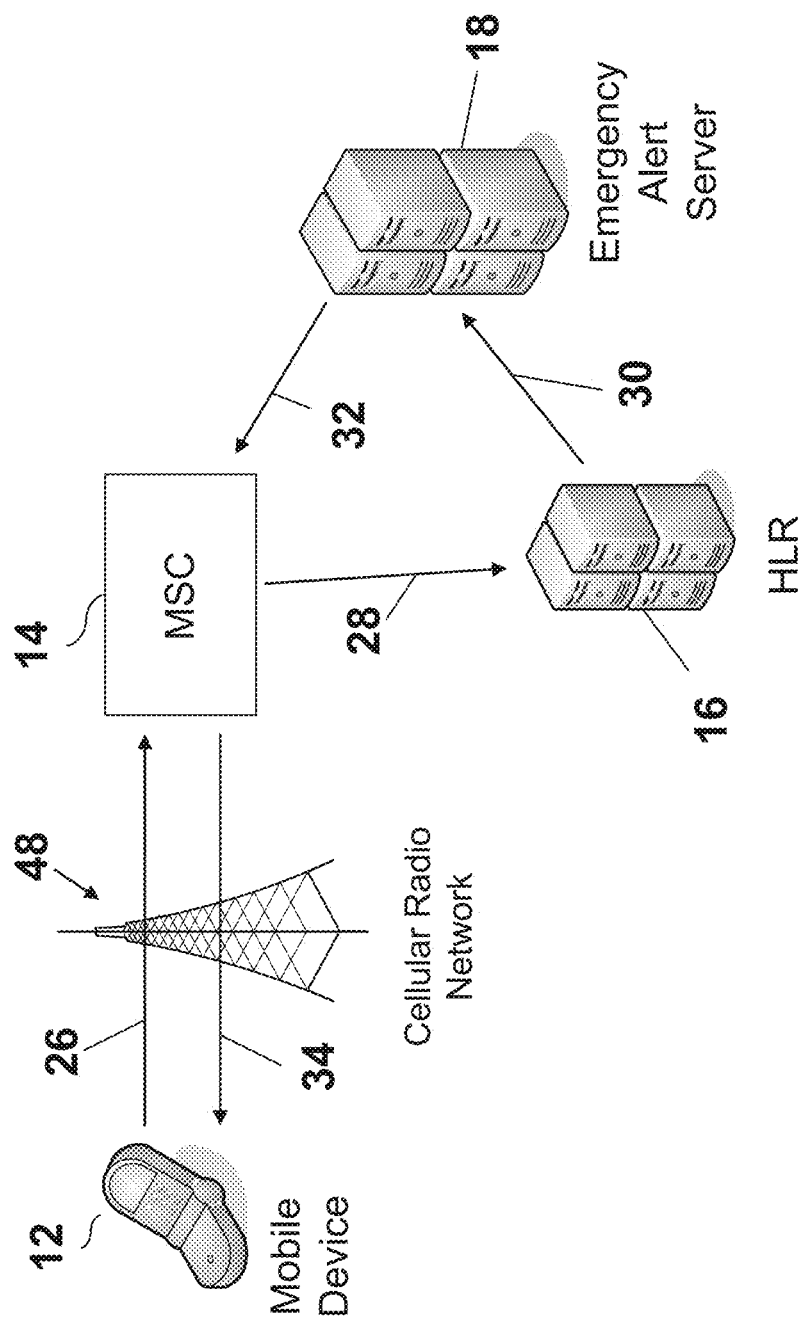
FIG. 1 is a flow diagram of an example process and system for assigning an EAS channel.

FIG. 1 is a flow diagram of an example process and system for assigning an EAS channel. At step 26, the mobile device 12 registers, via cellular network 48, with the mobile switching center (MSC) 14. An MSC performs switching functions along with other functions, such as registration. During registration, the MSC 14 receives registration information pertaining to the mobile device 12, the subscriber associated with the mobile device 12, and an indication of the cellular site from which the mobile device 12 is registering. The MSC 14, at step 28, provides registration information to the Home Location Register (HLR) 16. An HLR is a centralized database for users to register with a network. The HLR 16 stores static information about the subscriber of the mobile device 12 such as an indication of the subscriber's identity, subscribed services, and dynamic subscriber information such as the current location of the mobile subscriber (the current location of the mobile device 12). Upon receiving the registration request, the HLR 16 performs well known registration functions. Further, the HLR 16 analyzes the subscriber's profile information contained therein. If the profile information stored in the HLR 16 indicates that the subscriber wants to receive EAS messages, the HLR 16, at step 30, provides an indication thereof along with the registration information (including the indication of the cellular site in which the mobile device 12 is registering) to the Emergency Alert Server 18. The Emergency Alert Server 18 also maintains a list of the MSCs currently associated with each registered subscriber who wants to receive EAS messages.

Upon receiving, at step 30, the registration information including the indication of the cellular site in which the mobile device is located, the Emergency Alert Server 18 determines the channel, or channels, in that cellular site that are designated for EAS messages. At step 32, the Emergency Alert Server 18 provides, to the MSC 14, information pertaining to designated EAS channels for each cellular site associated with the MSC 14.

In an example embodiment, information pertaining to designated EAS channels for each cellular site comprises, for example, a listing or table, indicating the designated EAS channel or channels utilized by each cellular site associated with the MSC 14. The MSC 14, upon receiving, at step 32, the list of all EAS designated channels for each cellular site associated therewith, determines the cellular site in which the mobile device 12 is located. At step 34, the MSC 14 provides, to the mobile device 12 via cellular radio network 48, an indication of the EAS designated channel, or channels, for the cellular site in which the mobile device 12 is located. Upon receiving, at step 34, the indication of the EAS designated channel(s), the mobile device 12 assigns, within the mobile device 12, the EAS designated channel(s) for EAS related communications. That is, upon receiving, at step 34, the indication of the EAS designated channel, the mobile device 12 configures itself (e.g., programs itself) to receive EAS messages via the designated channel (or designated channels).

Each time a mobile device 12 registers with an MSC 14, steps 28, 30, 32, and 34 are performed. The lists maintained by the Emergency Alert Server 18 are updated and indications of new EAS designated channel(s) are provided to the mobile device 12. Thus, if a subscriber registers with a first MSC 14 and later registers with a different MSC 14, the Emergency Alert Server 18 updates the information stored therein pertaining to the subscriber, including an identification of the different MSC 14. In this way, the current location of a registered subscriber is maintained. If the HLR 16 determines that a mobile device 12 is no longer registered, the HLR 16 provides an indication thereof to the Emergency Alert Server 18 and the Emergency Alert Server 18 accordingly updates information stored therein pertaining to the subscriber associated with the mobile device 12.

In another example embodiment, the mobile device 12 is preconfigured with a table, or the like, of all possible EAS designated channels. Thus, the table comprises a plurality of potential designated channels. In this example embodiment, the preconfigured table is in a format known by the Emergency Alert Server 18 (e.g., a standard format). During registration, the Emergency Alert Server 18 provides a pointer to the appropriate designated channel in the preconfigured table of the mobile device 12.

In accordance with this example embodiment, wherein the mobile device 12 comprises a preconfigured table, and referring again to FIG. 1, at step 26, the mobile device 12 registers with the MSC 14. During registration, the MSC 14 receives registration information pertaining to the mobile device 12, the subscriber associated with the mobile device 12, an indication of the cellular site from which the mobile device 12 is registering, and an indication that the mobile device 12 is preconfigured with a table indicative of all possible EAS designated channels. The MSC 14, at step 28, provides this information to the HLR 16. Upon receiving this information, the HLR 16, at step 30, provides to the Emergency Alert Server 18, an indication thereof along with registration information, including an indication of the cellular site in which the mobile device 12 is registering and the indication that the mobile device 12 contains the preconfigured table.

Subsequent to step 30, the Emergency Alert Server 18 determines the appropriate point in the preconfigured table corresponding to the channel, or channels, in the cellular site of the mobile device 12 that are designated for EAS messages. At step 32, the Emergency Alert Server 18 provides, to the MSC 14, a pointer to the appropriate portion of the preconfigured table indicating the designated EAS channel(s) for the cellular site associated with the MSC 14 in which the mobile device 12 is located.

The MSC 14, upon receiving, at step 32, the pointer, provides to the mobile device 12 via cellular radio network 48, an indication of the pointer. Upon receiving, at step 34, the indication of the pointer, the mobile device 12, utilizing the pointer to access the appropriate portion of the preconfigured table therein, assigns the EAS designated channel(s) for EAS related communications. That is, upon receiving, at step 34, the indication of the EAS designated channel, the mobile device 12 configures itself (e.g., programs itself) to receive EAS messages via the designated channel (or designated channels) as selected from the preconfigured table.

The mobile device 12 is representative of any appropriate type of device that can assign a designated EAS channel and be utilized to receive an EAS message. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television).

The mobile device 12 can comprise any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a Walkman, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Figure 2:
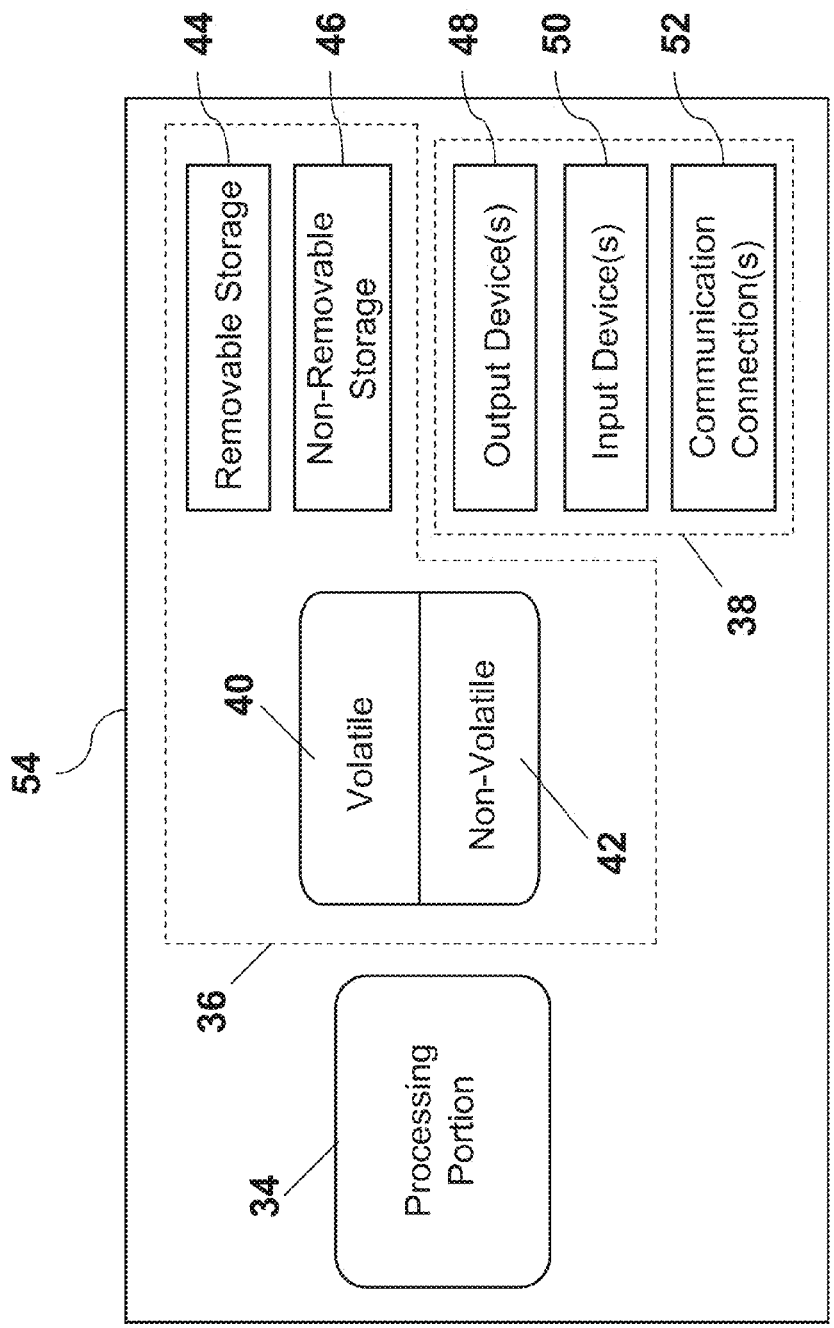
FIG. 2 is a block diagram of an example processor for assigning an EAS channel.

FIG. 2 is a block diagram of an example processor for assigning an EAS channel. In an example configuration, the processor 54 comprises the mobile device 12. It is emphasized that the block diagram depicted in FIG. 2 is exemplary and not intended to imply a specific implementation. Thus, the processor 54 can be implemented in a single processor or multiple processors. Multiple processors can be distributed or centrally located. Multiple processors can communicate wirelessly, via hard wire, or a combination thereof. The processor 54 can comprise any appropriate device for assigning an EAS channel.

The processor 54 comprises a processing portion 34, a memory portion 36, and an input/output portion 38. The processing portion 34, memory portion 36, and input/output portion 38 are coupled together (coupling not shown in FIG. 2) to allow communications therebetween. The input/output portion 38 is capable of providing and/or receiving components utilized to assign an EAS channel as described above. For example, as described above, the input/output portion 38 is capable of providing/receiving registration information for initiating the registration process, receiving an indication of the location (e.g., cellular site) of the mobile device, receiving an indication of a pointer to a table comprising a plurality of potential designated channels, or a combination thereof. The processing portion 34 is capable of assigning a channel of the mobile device to a designated channel, as described above.

The processor 54 can be implemented as a client processor and/or a server processor. In a basic configuration, the processor 54 can include at least one processing portion 34 and memory portion 36. The memory portion 36 can store any information utilized in conjunction with assigning an EAS channel. For example, as described, the memory portion is capable of storing the table comprising the plurality of potential designated channels. Depending upon the exact configuration and type of processor, the memory portion 36 can be volatile (such as RAM) 40, non-volatile (such as ROM, flash memory, etc.) 42, or a combination thereof. The processor 54 can have additional features/functionality. For example, the processor 54 can include additional storage (removable storage 44 and/or non-removable storage 46) including, but not limited to, magnetic or optical disks, tape, flash, smart cards or a combination thereof. Computer storage media, such as memory portion 36, 40, 42, 44, and 46, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 54. Any such computer storage media can be part of the processor 54.

The processor 54 can also contain communications connection(s) 52 that allow the processor 54 to communicate with other devices, for example. Communications connection(s) 52 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 54 also can have input device(s) 50 such as keyboard, mouse, pen, voice input device, touch input device, etc. Output device(s) 48 such as a display, speakers, printer, etc. also can be included.

Each of the MSC 14, HLR 16, and Emergency Alert Server 18 can comprise any appropriate type of processor. Example processors can be implemented in a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof. Thus the MSC 14, HLR 16, and Emergency Alert Server 18 can be implemented as a single processor, separate processors, distributed processors, or a combination thereof.

The following description sets forth some exemplary telephony radio networks and non-limiting operating environments in which EAS channel assignment can be implemented. The below-described operating environments should be considered non-exhaustive, however, and thus the below-described network architectures merely show how EAS channel assignment can be incorporated into existing network structures and architectures. It can be appreciated, however, that EAS channel assignment can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS channel assignment can be applied independently of the method for data transport, and do not depend on any particular network architecture, or underlying protocols.

Figure 3:
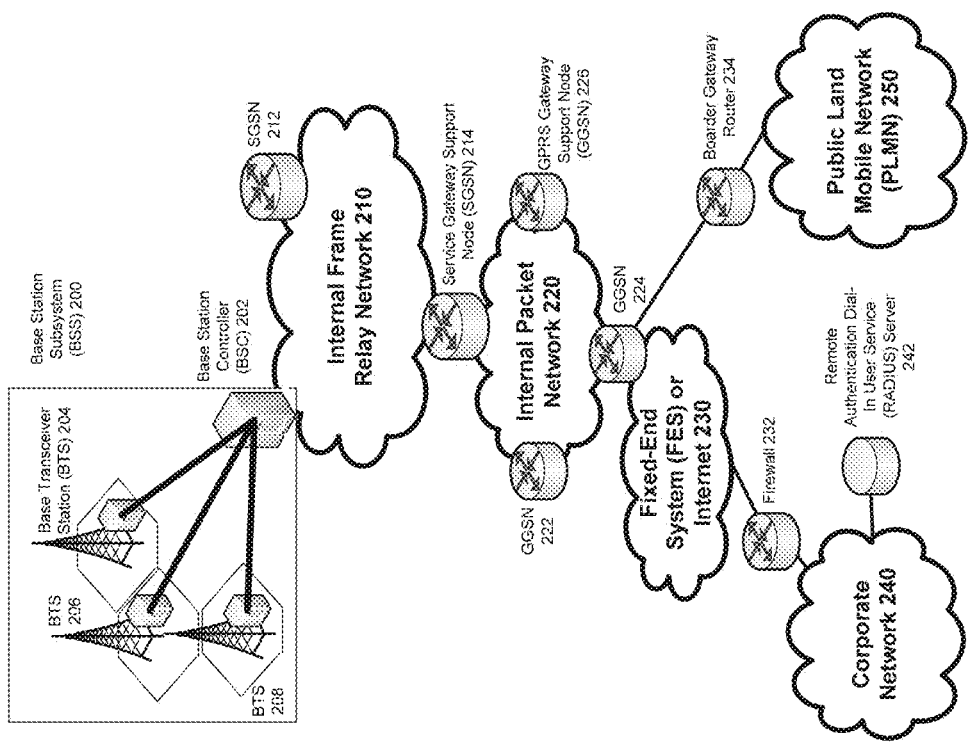
FIG. 3 depicts an overall block diagram of an exemplary packet-based mobile cellular network environment, such as a GPRS network, in which the system for assigning an EAS channel can be practiced.

FIG. 3 depicts an overall block diagram of an exemplary packet-based mobile cellular network environment, such as a GPRS network, in which the system for implementing EAS channel assignment can be practiced. In an example configuration, the cellular radio network 48 is encompassed by the network environment depicted in FIG. 3. In such an environment, there are a plurality of Base Station Subsystems ("BSS") 200 (only one is shown), each of which comprises a Base Station Controller ("BSC") 202 serving a plurality of Base Transceiver Stations ("BTS") such as BTSs 204, 206, and 208. BTSs 204, 206, 208, etc. are the access points where users of packet-based mobile devices (e.g., mobile device 12) become connected to the wireless network. In exemplary fashion, the packet traffic originating from user devices (e.g., user device 20) is transported via an over-the-air interface to a BTS 208, and from the BTS 208 to the BSC 202. Base station subsystems, such as BSS 200, are a part of internal frame relay network 210 that can include Service GPRS Support Nodes ("SGSN") such as SGSN 212 and 214. Each SGSN is connected to an internal packet network 220 through which a SGSN 212, 214, etc. can route data packets to and from a plurality of gateway GPRS support nodes (GGSN) 222, 224, 226, etc. As illustrated, SGSN 214 and GGSNs 222, 224, and 226 are part of internal packet network 220. Gateway GPRS serving nodes 222, 224 and 226 mainly provide an interface to external Internet Protocol ("IP") networks such as Public Land Mobile Network ("PLMN") 250, corporate intranets 240, or Fixed-End System ("FES") or the public Internet 230. As illustrated, subscriber corporate network 240 may be connected to GGSN 224 via firewall 232; and PLMN 250 is connected to GGSN 224 via border gateway router 234. The Remote Authentication Dial-In User Service ("RADIUS") server 242 may be used for caller authentication when a user of a mobile cellular device calls corporate network 240.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 4:
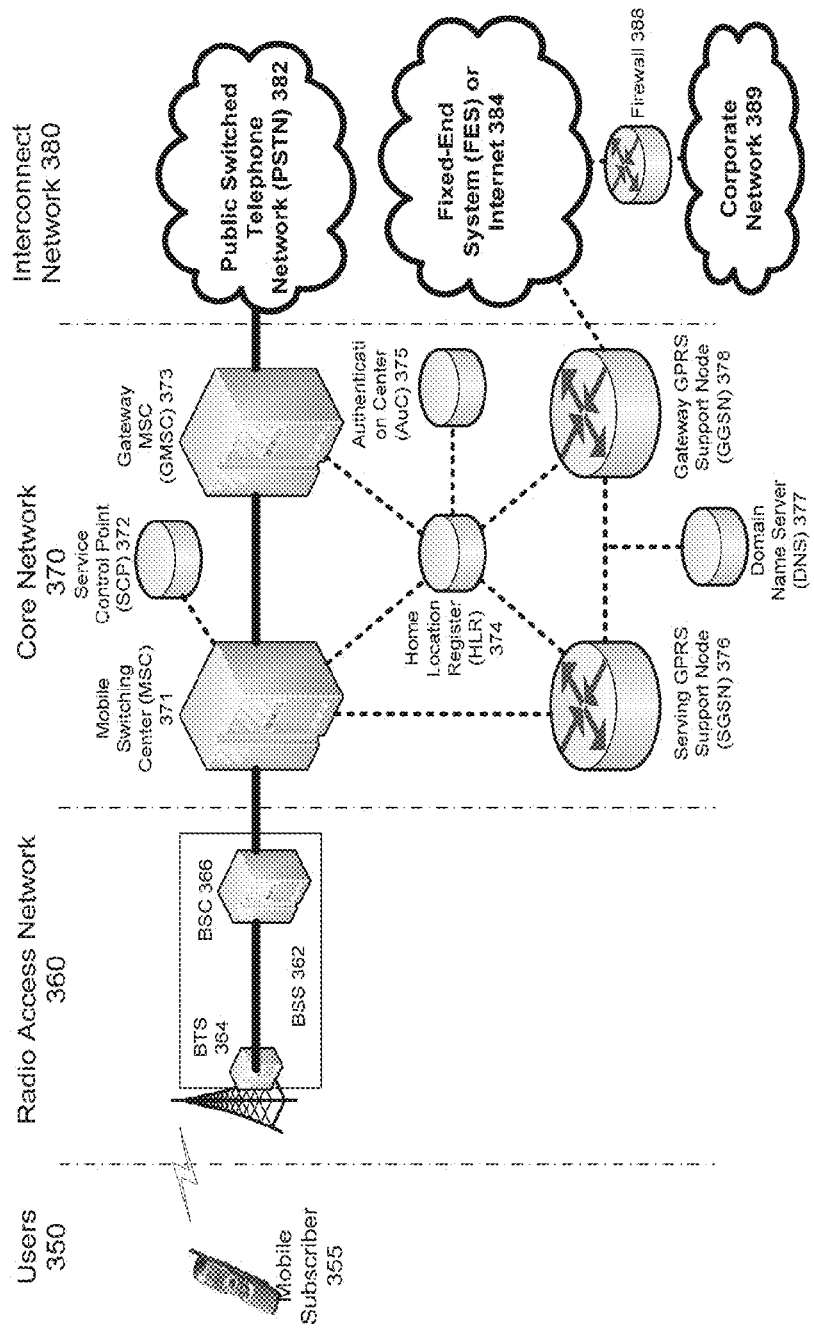
FIG. 4 illustrates an architecture of a typical GPRS network as segmented into four groups.

FIG. 4 illustrates an architecture of a typical GPRS network as segmented into four groups: users 350, radio access network 360, core network 370, and interconnect network 380. In an example configuration the emergency alert network 110, and the wireless broadcast network 116 are encompassed by the radio access network 360, core network 370, and interconnect network 380. Users 350 comprise a plurality of end users (though only mobile subscriber 355 is shown in FIG. 4). In an example embodiment, the device depicted as mobile subscriber 355 comprises mobile device 12. Radio access network 360 comprises a plurality of base station subsystems such as BSSs 362, which include BTSs 364 and BSCs 366. Core network 370 comprises a host of various network elements. As illustrated here, core network 370 may comprise Mobile Switching Center ("MSC") 371, Service Control Point ("SCP") 372, gateway MSC 373, SGSN 376, Home Location Register ("HLR") 374, Authentication Center ("AuC") 375, Domain Name Server ("DNS") 377, and GGSN 378. Interconnect network 380 also comprises a host of various networks and other network elements. As illustrated in FIG. 4, interconnect network 380 comprises Public Switched Telephone Network ("PSTN") 382, Fixed-End System ("FES") or Internet 384, firewall 388, and Corporate Network 389.

A mobile switching center can be connected to a large number of base station controllers. At MSC 371, for instance, depending on the type of traffic, the traffic may be separated in that voice may be sent to Public Switched Telephone Network ("PSTN") 382 through Gateway MSC ("GMSC") 373, and/or data may be sent to SGSN 376, which then sends the data traffic to GGSN 378 for further forwarding.

When MSC 371 receives call traffic, for example, from BSC 366, it sends a query to a database hosted by SCP 372. The SCP 372 processes the request and issues a response to MSC 371 so that it may continue call processing as appropriate.

The HLR 374 is a centralized database for users to register to the GPRS network. HLR 374 stores static information about the subscribers such as the International Mobile Subscriber Identity ("IMSI"), subscribed services, and a key for authenticating the subscriber. HLR 374 also stores dynamic subscriber information such as the current location of the mobile subscriber. Associated with HLR 374 is AuC 375. AuC 375 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 4, when mobile subscriber 355 initiates the attach process by turning on the network capabilities of the mobile device, an attach request is sent by mobile subscriber 355 to SGSN 376. The SGSN 376 queries another SGSN, to which mobile subscriber 355 was attached before, for the identity of mobile subscriber 355. Upon receiving the identity of mobile subscriber 355 from the other SGSN, SGSN 376 requests more information from mobile subscriber 355. This information is used to authenticate mobile subscriber 355 to SGSN 376 by HLR 374. Once verified, SGSN 376 sends a location update to HLR 374 indicating the change of location to a new SGSN, in this case SGSN 376. HLR 374 notifies the old SGSN, to which mobile subscriber 355 was attached before, to cancel the location process for mobile subscriber 355. HLR 374 then notifies SGSN 376 that the location update has been performed. At this time, SGSN 376 sends an Attach Accept message to mobile subscriber 355, which in turn sends an Attach Complete message to SGSN 376.

After attaching itself with the network, mobile subscriber 355 then goes through the authentication process. In the authentication process, SGSN 376 sends the authentication information to HLR 374, which sends information back to SGSN 376 based on the user profile that was part of the user's initial setup. The SGSN 376 then sends a request for authentication and ciphering to mobile subscriber 355. The mobile subscriber 355 uses an algorithm to send the user identification (ID) and password to SGSN 376. The SGSN 376 uses the same algorithm and compares the result. If a match occurs, SGSN 376 authenticates mobile subscriber 355.

Next, the mobile subscriber 355 establishes a user session with the destination network, corporate network 389, by going through a Packet Data Protocol ("PDP") activation process. Briefly, in the process, mobile subscriber 355 requests access to the Access Point Name ("APN"), for example, UPS.com (e.g., which can be corporate network 389 in FIG. 4) and SGSN 376 receives the activation request from mobile subscriber 355. SGSN 376 then initiates a Domain Name Service ("DNS") query to learn which GGSN node has access to the UPS.com APN. The DNS query is sent to the DNS server within the core network 370, such as DNS 377, which is provisioned to map to one or more GGSN nodes in the core network 370. Based on the APN, the mapped GGSN 378 can access the requested corporate network 389. The SGSN 376 then sends to GGSN 378 a Create Packet Data Protocol ("PDP") Context Request message that contains necessary information. The GGSN 378 sends a Create PDP Context Response message to SGSN 376, which then sends an Activate PDP Context Accept message to mobile subscriber 355.

Once activated, data packets of the call made by mobile subscriber 355 can then go through radio access network 360, core network 370, and interconnect network 380, in a particular fixed-end system or Internet 384 and firewall 388, to reach corporate network 389.

Thus, network elements that can invoke the functionality of EAS channel assignment can include but are not limited to Gateway GPRS Support Node tables, Fixed End System router tables, firewall systems, VPN tunnels, and any number of other network elements as required by the particular digital network.

Figure 5:
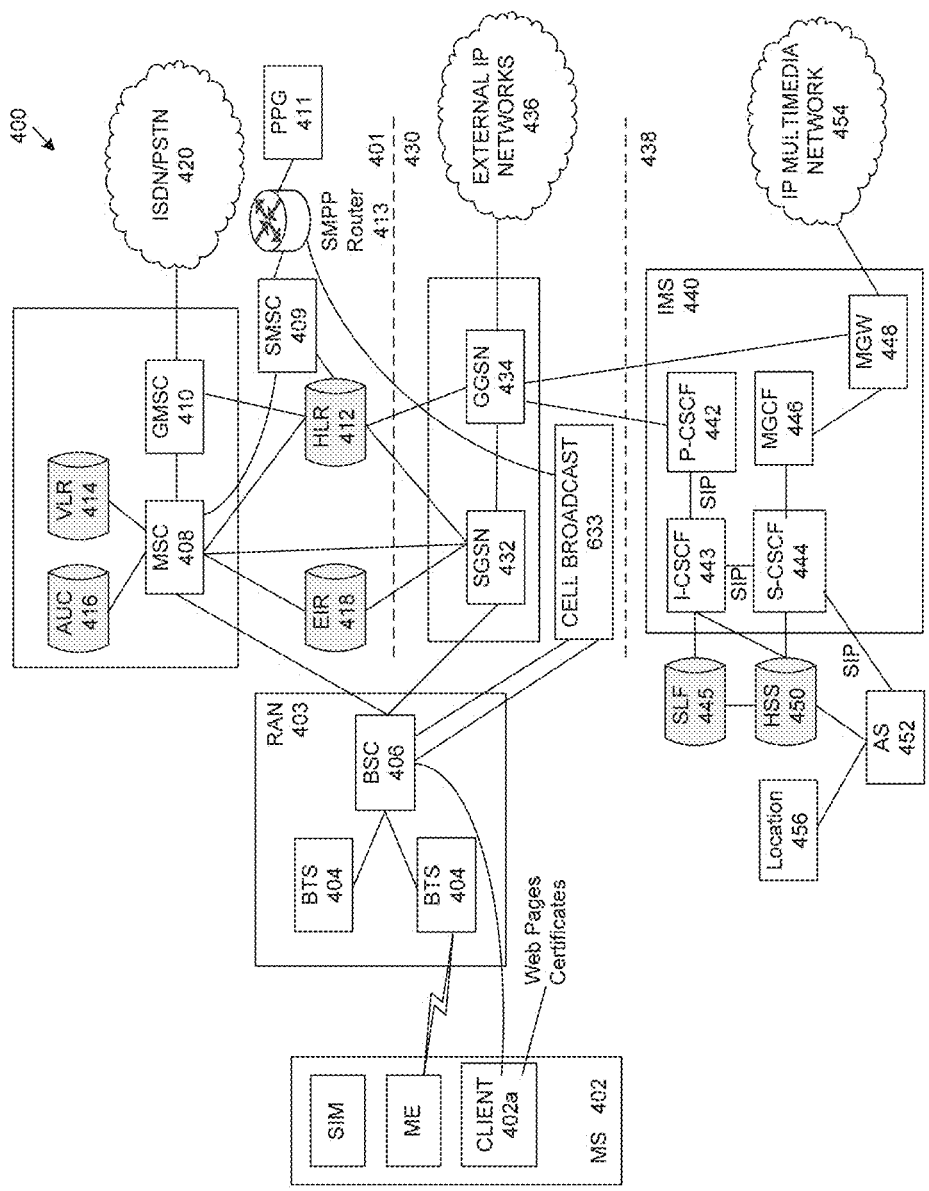
FIG. 5 illustrates an example alternate block diagram of an exemplary GSM/GPRS/IP multimedia network architecture in which EAS channel assignment can be incorporated.

FIG. 5 illustrates another exemplary block diagram view of a GSM/GPRS/IP multimedia network architecture 400 in which EAS channel assignment can be incorporated. As illustrated, architecture 400 of FIG. 5 includes a GSM core network 401, a GPRS network 430 and an IP multimedia network 438. The GSM core network 401 includes a Mobile Station (MS) 402, at least one Base Transceiver Station (BTS) 404 and a Base Station Controller (BSC) 406. The MS 402 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 404 is physical equipment, such as a radio tower, that enables a radio interface to communicate with the MS. Each BTS may serve more than one MS. The BSC 406 manages radio resources, including the BTS. The BSC may be connected to several BTSs. The BSC and BTS components, in combination, are generally referred to as a base station (BSS) or radio access network (RAN) 403.

The GSM core network 401 also includes a Mobile Switching Center (MSC) 408, a Gateway Mobile Switching Center (GMSC) 410, a Home Location Register (HLR) 412, Visitor Location Register (VLR) 414, an Authentication Center (AuC) 418, and an Equipment Identity Register (EIR) 416. The MSC 408 performs a switching function for the network. The MSC also performs other functions, such as registration, authentication, location updating, handovers, and call routing. The GMSC 410 provides a gateway between the GSM network and other networks, such as an Integrated Services Digital Network (ISDN) or Public Switched Telephone Networks (PSTNs) 420. Thus, the GMSC 410 provides interworking functionality with external networks.

The HLR 412 is a database that contains administrative information regarding each subscriber registered in a corresponding GSM network. The HLR 412 also contains the current location of each MS. The VLR 414 is a database that contains selected administrative information from the HLR 412. The VLR contains information necessary for call control and provision of subscribed services for each MS currently located in a geographical area controlled by the VLR. The HLR 412 and the VLR 414, together with the MSC 408, provide the call routing and roaming capabilities of GSM. The AuC 416 provides the parameters needed for authentication and encryption functions. Such parameters allow verification of a subscriber's identity. The EIR 418 stores security-sensitive information about the mobile equipment.

A Short Message Service Center (SMSC) 409 allows one-to-one Short Message Service (SMS) messages to be sent to/from the MS 402. A Push Proxy Gateway (PPG) 411 is used to "push" (i.e., send without a synchronous request) content to the MS 402. The PPG 411 acts as a proxy between wired and wireless networks to facilitate pushing of data to the MS 402. A Short Message Peer to Peer (SMPP) protocol router 413 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 402 sends a location update including its current location information to the MSC/VLR, via the BTS 404 and the BSC 406. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 430 is logically implemented on the GSM core network architecture by introducing two packet-switching network nodes, a serving GPRS support node (SGSN) 432, a cell broadcast and a Gateway GPRS support node (GGSN) 434. The SGSN 432 is at the same hierarchical level as the MSC 408 in the GSM network. The SGSN controls the connection between the GPRS network and the MS 402. The SGSN also keeps track of individual MS's locations and security functions and access controls.

A Cell Broadcast Center (CBC) 433 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 434 provides a gateway between the GPRS network and a public packet network (PDN) or other IP networks 436. That is, the GGSN provides interworking functionality with external networks, and sets up a logical link to the MS through the SGSN. When packet-switched data leaves the GPRS network, it is transferred to an external TCP-IP network 436, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 430 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 438 was introduced with 3GPP Release 5, and includes an IP multimedia subsystem (IMS) 440 to provide rich multimedia services to end users. A representative set of the network entities within the IMS 440 are a call/session control function (CSCF), a media gateway control function (MGCF) 446, a media gateway (MGW) 448, and a master subscriber database, called a home subscriber server (HSS) 450. The HSS 450 may be common to the GSM network 401, the GPRS network 430 as well as the IP multimedia network 438.

The IP multimedia system 440 is built around the call/session control function, of which there are three types: an interrogating CSCF (I-CSCF) 443, a proxy CSCF (P-CSCF) 442, and a serving CSCF (S-CSCF) 444. The P-CSCF 442 is the MS's first point of contact with the IMS 440. The P-CSCF 442 forwards session initiation protocol (SIP) messages received from the MS to an SIP server in a home network (and vice versa) of the MS. The P-CSCF 442 may also modify an outgoing request according to a set of rules defined by the network operator (for example, address analysis and potential modification).

The I-CSCF 443, forms an entrance to a home network and hides the inner topology of the home network from other networks and provides flexibility for selecting an S-CSCF. The I-CSCF 443 may contact a subscriber location function (SLF) 445 to determine which HSS 450 to use for the particular subscriber, if multiple HSS's 450 are present. The S-CSCF 444 performs the session control services for the MS 402. This includes routing originating sessions to external networks and routing terminating sessions to visited networks. The S-CSCF 444 also decides whether an application server (AS) 452 is required to receive information on an incoming SIP session request to ensure appropriate service handling. This decision is based on information received from the HSS 450 (or other sources, such as an application server 452). The AS 452 also communicates to a location server 456 (e.g., a Gateway Mobile Location Center (GMLC)) that provides a position (e.g., latitude/longitude coordinates) of the MS 402.

The HSS 450 contains a subscriber profile and keeps track of which core network node is currently handling the subscriber. It also supports subscriber authentication and authorization functions (AAA). In networks with more than one HSS 450, a subscriber location function provides information on the HSS 450 that contains the profile of a given subscriber.

The MGCF 446 provides interworking functionality between SIP session control signaling from the IMS 440 and ISUP/BICC call control signaling from the external GSTN networks (not shown). It also controls the media gateway (MGW) 448 that provides user-plane interworking functionality (e.g., converting between AMR- and PCM-coded voice). The MGW 448 also communicates with other IP multimedia networks 454.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of EAS channel assignment have been described in connection with various computing devices, the underlying concepts can be applied to any computing device or system capable of EAS channel assignment. The various techniques described herein can be implemented in connection with hardware or software or, where appropriate, with a combination of both. Thus, the methods and apparatus for EAS channel assignment, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing EAS channel assignment. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for EAS channel assignment also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for EAS channel assignment. When implemented on a general-purpose processor, the program code combines with the processor to provide a unique apparatus that operates to invoke the functionality of EAS channel assignment. Additionally, any storage techniques used in connection with EAS channel assignment can invariably be a combination of hardware and software.

While EAS channel assignment has been described in connection with the various embodiments of the various figures, it is to be understood that other similar embodiments can be used or modifications and additions can be made to the described embodiment for performing the same function of EAS channel assignment without deviating therefrom. For example, one skilled in the art will recognize that a system for EAS channel assignment as described may apply to any environment, whether wired or wireless, and may be applied to any number of devices connected via a communications network and interacting across the network. Therefore, EAS channel assignment should not be limited to any single embodiment, but rather should be construed in breadth and scope in accordance with the appended claims.

What is claimed is:

1. A server comprising:
a processor; and
memory coupled to the processor, the memory comprising executable instructions that when executed by the processor cause the processor to effectuate operations comprising:
receiving an indication of a location of a device, wherein the device is a television using wireless communication;
maintaining the location of the television based on a list of switching centers that is updated by the server when the connection between the television and a switching center is updated;
receiving from the device an indication of a plurality of available designated channels;
responsive to receiving the indication of the plurality of available designated channels, selecting from the plurality of available designated channels, a first designated channel associated with the received indication of location, wherein the first designated channel comprises an emergency alert system channel for the television; and
providing an indication to the device to communicate via the first designated channel, wherein the device configures itself to receive emergency alert messages via the first designated channel based on the provided indication to communicate via the first designated channel.

2. The server of claim 1, wherein the indication of the first designated channel comprises a pointer to a table comprising a plurality of potential designated channels.

3. The server of claim 1, the operations further comprising:
receiving an update from a home location register that the television is no longer registered; and
updating the list of switching centers based on the update from the home location register.

4. The server of claim 1, wherein the first designated channel comprises a channel dedicated for a specific purpose.

5. The server of claim 1, wherein the device is preconfigured with the plurality of available designated channels for an emergency alert system.

6. The server of claim 1, the operations further comprising receiving a message with an indication that the device contains a table preconfigured with available designated channels for an emergency alert system.

7. The server of claim 1, the operations further comprising:
receiving an indication that the device is no longer registered with a switching center of a first location, the switching center performs functions comprising switching and registration; and
updating the first designated channel based on the indication that the device is no longer registered with the switching center.

8. A method comprising:
receiving, by a processor, an indication of a location of a device, wherein the device is a television using wireless communication;
maintaining, by the processor, the location of the television based on a list of switching centers that is updated by the server when the connection between the television and a switching center is updated;
receiving, by the processor, from the device an indication of a plurality of available designated channels;
responsive, by the processor, to receiving the indication of the plurality of available designated channels, selecting from the plurality of available designated channels, a first designated channel associated with the received indication of location, wherein the first designated channel comprises an emergency alert system channel; and
providing, by the processor, an indication to the device to communicate via the first designated channel, wherein the device configures itself to receive emergency alert messages via the first designated channel.

9. The method of claim 8, wherein the indication of the first designated channel comprises a pointer to a table comprising a plurality of potential designated channels.

10. The method of claim 8, wherein the first designated channel comprises foreign language channel.

11. The method of claim 8, wherein the first designated channel comprises a channel dedicated for a specific purpose.

12. The method of claim 8, wherein the device is preconfigured with the plurality of available designated channels for an emergency alert system.

13. The method of claim 8, further operations comprising receiving a message with an indication that the device contains a table preconfigured with available designated channels for an emergency alert system.

14. The method of claim 8, further operations comprising:
receiving an indication that the device is no longer registered with a switching center of a first location, the switching center performs functions comprising switching and registration; and updating the first designated channel based on the indication that the device is no longer registered with the switching center.

15. A system comprising:

a device; and a server communicatively connected with the device, the server comprising:

a processor; and memory coupled to the processor, the memory comprising executable instructions that when executed by the processor cause the processor to effectuate operations comprising:

receiving an indication of a location of the device, the device, wherein the device is a television;

maintaining the location of the television based on a list of switching centers that is updated by the server when the connection between the television and a switching center is updated;

receiving from the device an indication of a plurality of available designated channels;

responsive to receiving the indication of the plurality of available designated channels, selecting from the plurality of available designated channels, a first designated channel associated with the received indication of location, wherein the first designated channel comprises an emergency alert system channel; and providing an indication to the device to communicate via the first designated channel, wherein the device configures itself to receive emergency alert messages via the first designated channel based on the provided indication to communicate via the first designated channel.

16. The system of claim 15, wherein the indication of the first designated channel comprises a pointer to a table comprising a plurality of potential designated channels.

* * * * *